(12) United States Patent
Kitano et al.

(10) Patent No.: US 7,533,743 B2
(45) Date of Patent: May 19, 2009

(54) CONTROL DEVICE FOR HYBRID VEHICLE

(75) Inventors: Kazuhiko Kitano, Kawachi-gun (JP);
Tetsurou Hamada, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 1201 days.

(21) Appl. No.: 10/334,064

(22) Filed: Dec. 31, 2002

(65) Prior Publication Data

US 2003/0132044 A1 Jul. 17, 2003

(30) Foreign Application Priority Data

Jan. 15, 2002 (JP) ............................ P2002-006685

(51) Int. Cl.
*B60K 1/00* (2006.01)
(52) U.S. Cl. .................. 180/65.2; 180/65.3; 701/69
(58) Field of Classification Search .............. 180/65.1, 180/65.2, 65.3, 65.4, 65.5, 65.8, 65.7; 475/149, 475/2, 5; 701/69, 22
See application file for complete search history.

(56) References Cited

U.S. PATENT DOCUMENTS

| | | | | |
|---|---|---|---|---|
| 5,346,031 A | * | 9/1994 | Gardner | 180/65.2 |
| 5,495,906 A | * | 3/1996 | Furutani | 180/65.2 |
| 5,988,307 A | * | 11/1999 | Yamada et al. | 180/65.3 |
| 6,119,799 A | * | 9/2000 | Morisawa et al. | 180/65.2 |
| 6,319,168 B1 | * | 11/2001 | Morris et al. | 477/5 |
| 6,383,114 B1 | * | 5/2002 | Hoshiya et al. | 477/2 |
| 6,540,636 B2 | * | 4/2003 | Amanuma et al. | 475/149 |
| 6,549,840 B1 | * | 4/2003 | Mikami et al. | 180/65.2 |

FOREIGN PATENT DOCUMENTS

| | | |
|---|---|---|
| JP | 06-153312 | 5/1994 |
| JP | 8-237806 | 9/1996 |
| JP | 09-215107 | 8/1997 |
| JP | 09-284911 | 10/1997 |
| JP | 11-178109 | 7/1999 |
| JP | 2000-43696 | 2/2000 |
| JP | 2000-166004 | 6/2000 |
| JP | 2001-171378 | 6/2001 |
| JP | 2002-78110 | 3/2002 |

\* cited by examiner

*Primary Examiner*—Hau V Phan
(74) *Attorney, Agent, or Firm*—Arent Fox LLP.

(57) ABSTRACT

A control device for a hybrid vehicle prevents a decrease in the total amount of regenerated energy in the entire vehicle while ensuring the stability of the vehicle when the vehicle decelerates. When the vehicle decelerates and regenerated energy is recovered by the regeneration operation of front motor and rear motor, the ECU sets the amount of regeneration, which is transferred from front wheels to rear wheels, depending on the steered angle of the front wheels and on the deceleration state of the vehicle. In addition, the ECU subtracts the amount of regeneration to be transferred from regeneration torque command value for rear wheels demanding from the rear motor, and adds the same amount of regeneration to regeneration torque command value for front wheels demanding from the front motor.

2 Claims, 7 Drawing Sheets

BRAKE SWITCH OFF

FIG. 4B

BRAKE SWITCH ON

CONTROL DEVICE FOR HYBRID VEHICLE

BACKGROUND OF THE INVENTION

1. Field of the Invention

The present invention relates to a control device for a hybrid vehicle having an engine and a motor for outputting driving power, and in particular, the present invention relates to a control technique which controls the amount of regeneration during regenerative operation of the motor when the vehicle decelerates.

2. Description of the Related Art

A traction control device for a four-wheel drive hybrid vehicle, such as a traction control device for a four-wheel drive hybrid vehicle disclosed in Japanese Unexamined Patent Application, First Publication No. Hei 09-284911, in which the hybrid vehicle comprises an internal combustion engine and a first motor for driving one of front wheels or rear wheels, and a second motor for driving the other of the front wheels or rear wheels, and which controls traction distribution based on the state of charge of a battery device which communicates with each of the motors in terms of electrical energy, has been known in the art.

The above traction control device comprises a traction distribution control section which, when one or more wheels is slipping (i.e., slip state), controls traction distribution to the front and rear wheels so as to stop slipping of the wheels, and a distribution change restriction section for restricting change in traction distribution to the front and rear wheels when the vehicle turns, and thus the control device is constructed so as to ensure the maneuverability and stability of the vehicle while ensuring desired traction.

For example, the traction distribution control section in a slip state is constructed so as to set the vehicle to be in a four-wheel drive mode and also to reduce only the traction of the slipping wheels so as to stop the slipping of the wheels when slipping is detected based on a difference between the rotational speeds of the front wheels and rear wheels which are measured using wheel speed sensors.

Moreover, the distribution change restriction section is constructed so as to prohibit the change in the drive mode other than a predetermined drive mode change based on the determination as to whether the maneuverability and stability of the vehicle may be lost by the change in the drive mode when the vehicle turns.

In the above-mentioned conventional control device for a four-wheel drive hybrid vehicle, a problem occurs in that the total amount of regenerated energy which can be recovered in the entire vehicle is reduced if merely the regenerative torque of the slipping wheel is reduced, or if merely the regenerative operation of the slipping wheel is prohibited as in a state in which the vehicle is driven, when, for example, the vehicle is in a state in which the first and second motors are used in regenerative operation mode.

SUMMARY OF THE INVENTION

In consideration of the above circumstances, an object of the present invention is to provide a control device for a hybrid vehicle which enables preventing a decrease in the total amount of regenerated energy which can be recovered in the entire vehicle while ensuring the stability of the vehicle when the vehicle decelerates.

In order to solve the above problems and to achieve the above object, the present invention provides a control device for a hybrid vehicle comprising: front wheels which are steerable, and which are connectable to at least one of an internal combustion engine and a first motor via a transmitting section; rear wheels which are connected to a second motor; a regenerative operation control section which enables regeneration of energy through the regenerative operation of the first motor and second motor when the vehicle decelerates; and a regeneration amount control section which operates so as to decrease the amount of regeneration to be regenerated by on the second motor while increasing the amount of regeneration to be regenerated by the first motor depending on the steered angle of the front wheels.

According to the control device for a hybrid vehicle as constructed above, the regeneration amount control section adds a predetermined amount of regeneration depending on the steered angle of the front wheels to the amount of regeneration to be regenerated by the first motor while subtracting the same amount from the amount of regeneration to be regenerated by the second motor when, during deceleration of the vehicle, the first motor connected to the front wheels and the second motor connected to the rear wheels are operated by the regenerative operation control section so as to regenerate energy.

Accordingly, the regeneration force in the rear wheels which support relatively lower loads than that of the front wheels when the vehicle turns, is reduced, i.e., the braking force produced by the rear wheels is reduced, whereby it is possible to ensure the lateral force of the rear wheels, and it is possible to improve the stability of the vehicle.

Furthermore, because the amount of regeneration subtracted from the regeneration amount by the second motor connected to the rear wheels is added to the amount of regeneration to be regenerated by the first motor connected to the front wheels to which more load is applied than to the rear wheels, decrease in the total amount of regenerated energy in the entire vehicle can be prevented; therefore, an effective deceleration regeneration can be performed.

The control device of the present invention may further comprise: a deceleration state measuring section which measures the deceleration state of the vehicle; and a regeneration amount changing section which changes the amounts of regeneration to be regenerated by the first and second motor, each of which is set by the regeneration amount control section, depending on the deceleration state measured by the deceleration state measuring section.

According to the control device for a hybrid vehicle as constructed above, the deceleration state measuring section measures the deceleration state of the vehicle based on, for example, whether the accelerator pedal is operated, or based on the degree of deceleration of the vehicle depending on the degree of brake operation. The regeneration amount changing section sets a predetermined amount of regeneration which is subtracted from the amount of regeneration to be regenerated by the second motor and which is added to the amount of regeneration to be regenerated by the first motor depending on the deceleration state measured by the deceleration state measuring section.

Accordingly, because the transfer amount of regeneration from the rear wheels to the front wheels when the vehicle decelerates is properly set depending on the degrees of turning and deceleration of the vehicle, the stability of the vehicle and the efficiency of regeneration can be further improved.

DESCRIPTION OF THE PREFERRED EMBODIMENTS

An embodiment of the control device for a hybrid vehicle according to the present invention will be explained below with reference to the appended drawings.

Figure 1:
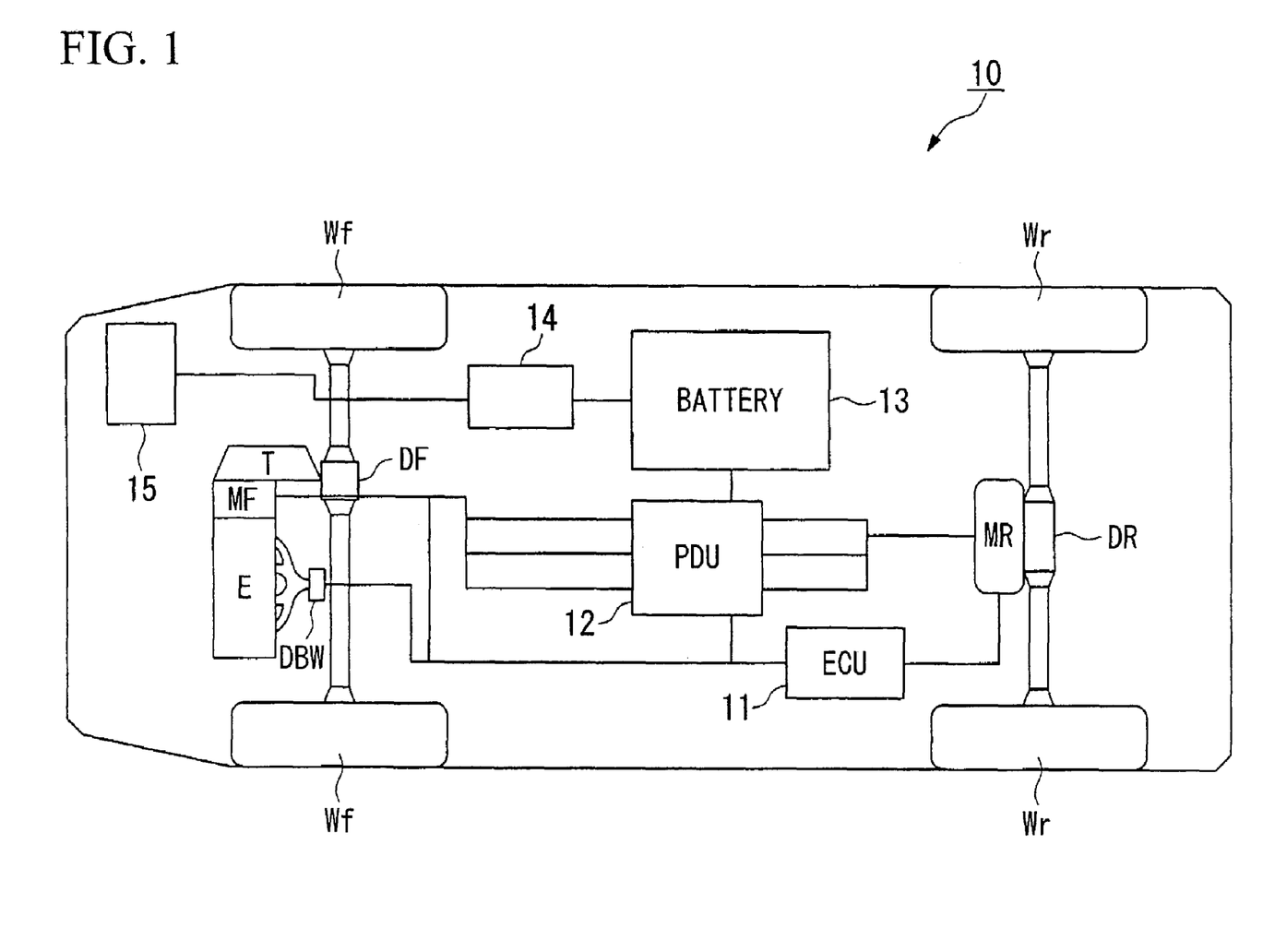
FIG. 1 is a block diagram showing the general structure of a hybrid vehicle having a control device for a hybrid vehicle in an embodiment according to the present invention.
Figure 2:
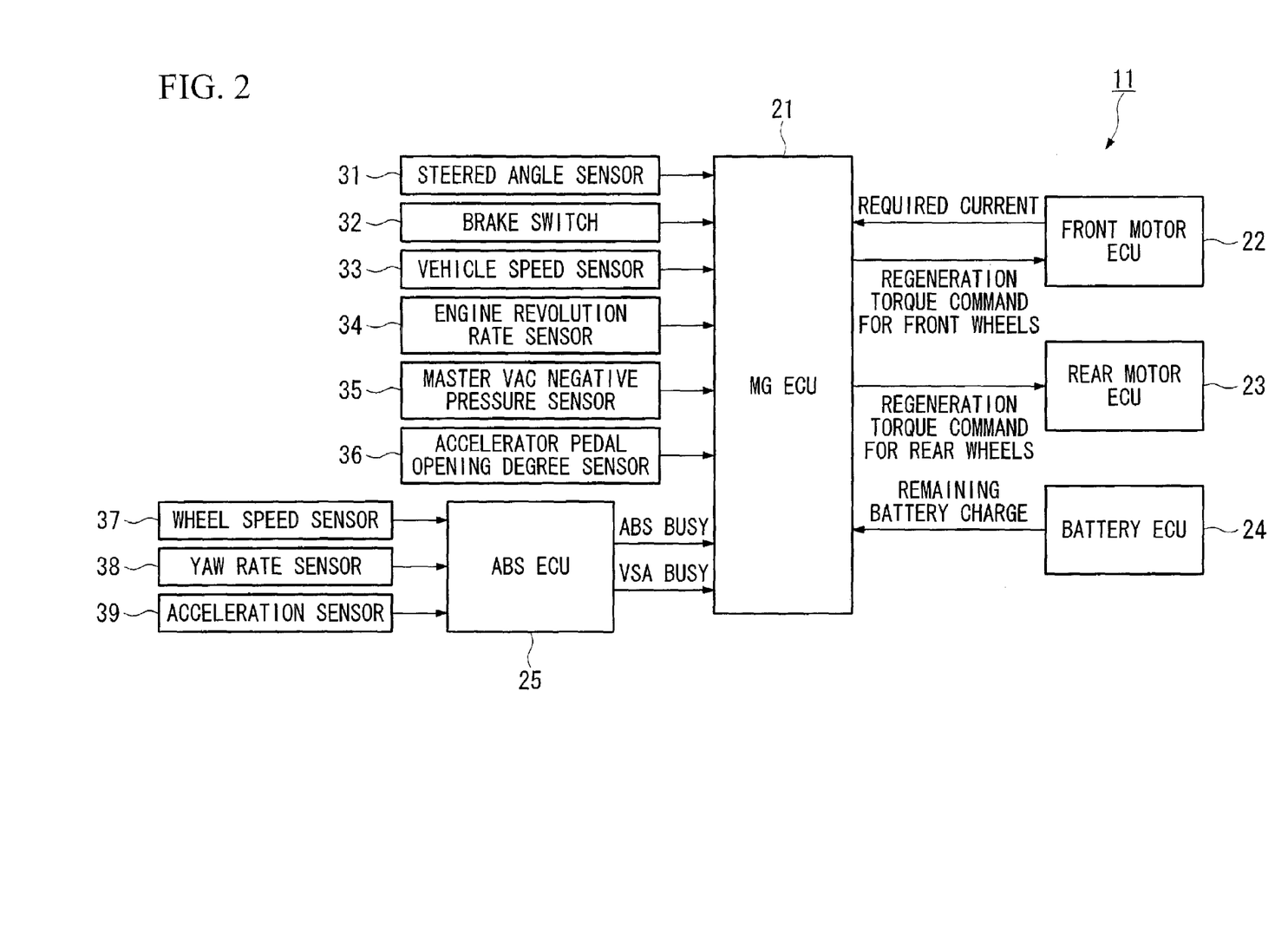
FIG. 2 is a block diagram showing the general structure of an ECU shown in FIG. 1.

FIG. 1 is a block diagram showing the general structure of a hybrid vehicle having a control device 10 for a hybrid vehicle in an embodiment according to the present invention, and FIG. 2 is a block diagram showing the general structure of the ECU shown in FIG. 1.

In the control device 10 for a hybrid vehicle according to the present embodiment, for example, an internal combustion engine E, a front motor MF, and a transmission T are connected to front wheels Wf and Wf in series, and a rear motor MR is connected to rear wheels Wr and Wr.

More specifically, the driving forces of both of the internal combustion engine E and front motor MF are transmitted to the front wheels Wf and Wf via the transmission T, such as an automatic transmission (AT), a CVT, or a manual transmission (MT), and via a front differential device DF which controls distribution of the driving force to each, the left and right, of the front wheels Wf and Wf.

Moreover, the driving force of the rear motor MR is transmitted to the rear wheels Wr and Wr via a rear differential device DR which includes two clutches (not shown) being able to control the engaging forces to each, the left and right, of the rear wheels Wr and Wr, and which controls distribution of the driving force to each, the left and right, of the rear wheels Wr and Wr.

When the two clutches (not shown) provided in the rear differential device DR are disengaged, the vehicle goes into a front-wheel drive mode in which only the front wheels Wf and Wf are driven, and when these clutches are engaged so that the engaging forces thereof are variable, the vehicle goes into a four-wheel drive mode in which both of the front wheels Wf and Wf and the rear wheels Wr and Wr are driven, and in which the distribution of driving force to the left and right rear wheels Wr and Wr can be freely controlled.

In addition, when driving forces are transmitted from the front wheels Wf and Wf to the front motor MF, and from the rear wheels Wr and Wr to the rear motor MR during deceleration of the vehicle, the motors MF and MR function as generators and produce so-called regenerative braking forces, whereby the kinetic energy of the vehicle body is recovered as electrical energy.

The driving operation and regenerative operation of each of the motors MF and MR is controlled by a power drive unit (PDU) 12 which receives control commands from the ECU 11.

The power drive unit 12 is connected to a high voltage battery 13 which communicates with each of the motor MF and MR in terms of electrical energy. The battery 13 comprises, for example, a plurality of modules connected in series, each of which is a unit comprising a plurality of cells. Furthermore, an auxiliary 12-volt battery 15, which is provided for operating various auxiliaries, is connected to the battery 13 via a downverter 14 consisting of a DC-DC converter.

The downverter 14 controlled by the ECU 11 charges the auxiliary battery 15 by decreasing the voltage of the battery 13.

As shown in FIG. 2, the ECU 11 comprises an MGECU 21, a front motor ECU 22 which controls the driving operation and regenerative operation of the front motor MF, a rear motor ECU 23 which controls the driving operation and regenerative operation of the rear motor MR, a battery ECU 24, and an ABSECU 25 which controls the operation of an anti-lock brake system, the operation of a vehicle behavior stabilizing system, or the like.

In addition to the front and rear motor ECUS 22 and 23 and the downverter 14, an MGECU 21 controls the transmission T and an electronic throttle control device DBW and the like.

For such a control operation, the following signals are input to the MGECU 21: a signal from a steer angle sensor 31 which measures the direction and magnitude of the steered angle input by the driver via a steering wheel for steering the front wheels Wf; a signal from a brake switch 32 which measures the operation of a brake pedal; a signal from a vehicle speed sensor 33 which measures a vehicle speed VP; a signal from a engine revolution rate sensor 34 which measures a engine revolution rate NE; a signal from a master vac negative pressure sensor 35 which measures the negative pressure in the master vac for the brake system; and a signal from an accelerator pedal opening degree sensor 36 which measures the opening degree of the accelerator pedal.

The front motor ECU 22 controls the regenerative operation of the front motor MF depending on a front regeneration torque command value input from the MGECU 21, the front motor ECU 22 also inputs a signal indicating electrical current demand when, for example, the vehicle is driven by the front motor MF.

The rear motor ECU 23 controls the regenerative operation of the rear motor MR depending on a rear regeneration torque command value input from the MGECU 21.

The battery ECU 24 not only protects the battery 13, but also calculates a remaining battery charge SOC and inputs a corresponding signal to the MGECU 21.

The ABSECU 25 controls the operation of the anti-lock brake system, the operation of the vehicle behavior stabilizing system, or the like, based on, for example, a signal input from a wheel speed sensor 37 which measures the rotational speed of the front wheels Wf and rear wheels Wr, a signal input from a yaw rate sensor 38 which measures the yaw rate of the vehicle (i.e., the rotational angular rate about the vertical axis at the center of gravity of the vehicle), and a signal input from an acceleration sensor 39 which measures the acceleration of the vehicle. The ABSECU 25 inputs signals to the MGECU 21, such as an ABS busy signal which indicates that the anti-lock brake system is in operation, and a VSA busy signal which indicates that the control operation for stabilizing the vehicle behavior is being executed, in which the stability of the vehicle is improved by the operation of the brake system.

As will be explained below, the ECU 21 decreases a regenerative rear torque command value (corresponding to the amount of regeneration) for the rear motor MR, while, on the other hand, increasing a regenerative front torque command value (corresponding to the amount of regeneration) for the front motor MF when the regenerated energy is recovered by the regenerative operations of the front and rear motors MF and MR during deceleration of the vehicle.

The control device 10 for a hybrid vehicle in this embodiment comprises the above-mentioned elements. Next, the operation of the control device 10 for a hybrid vehicle, more specifically, the operation for determining an amount of regeneration which is to be regenerated by the motors MF and MR will be explained below with reference to the appended drawings.

Figure 3:
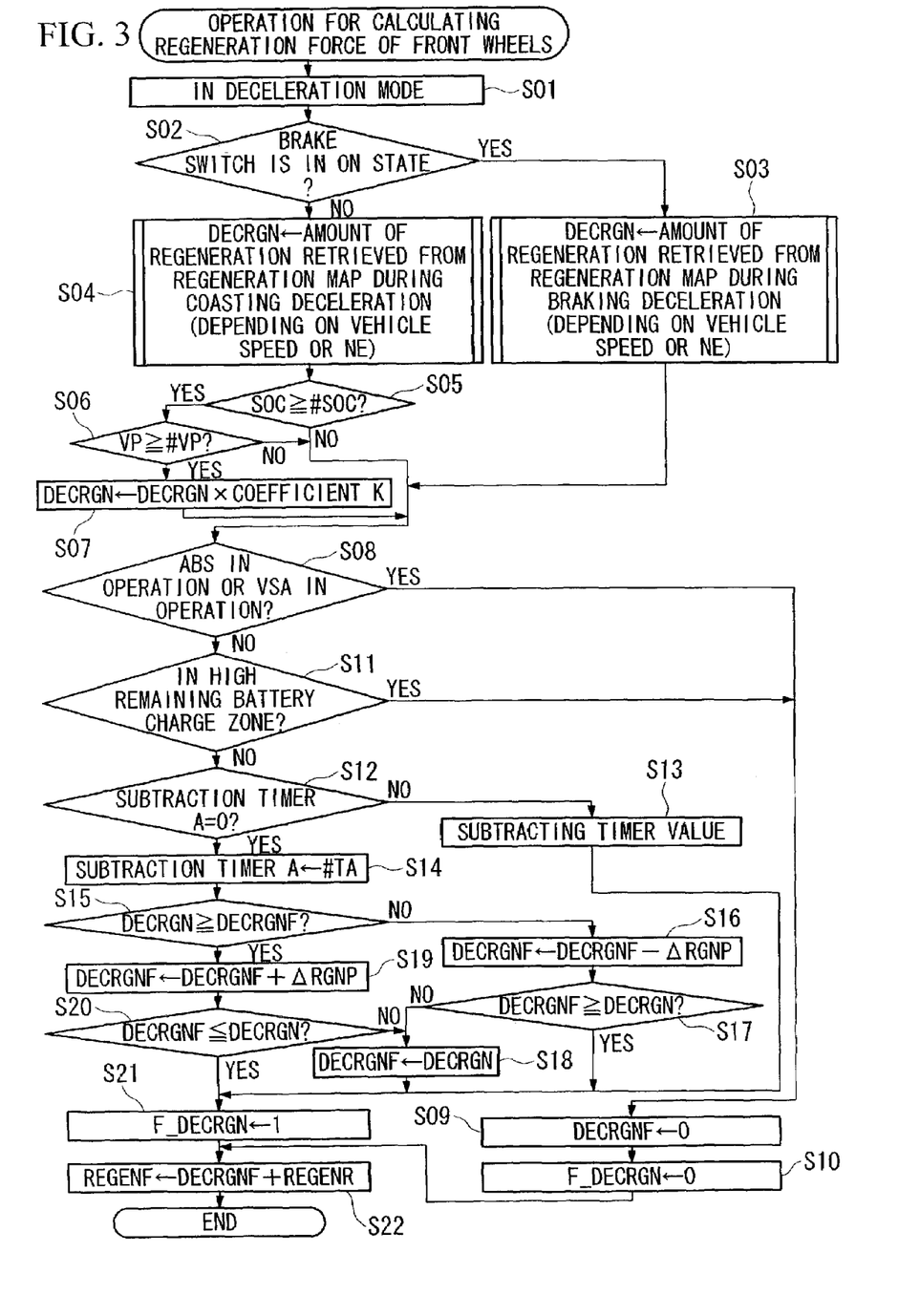
FIG. 3 is a flowchart showing the operation for setting an amount of regeneration to be regenerated by a front motor MF when the vehicle decelerates.
Figure 4A:
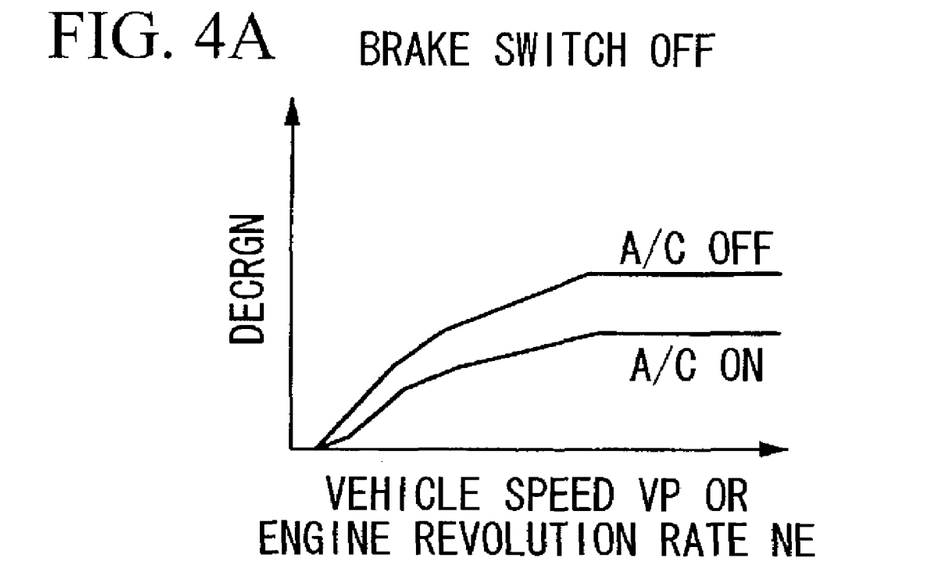
FIG. 4A is a graph showing a regeneration map during coasting deceleration.
Figure 4B:
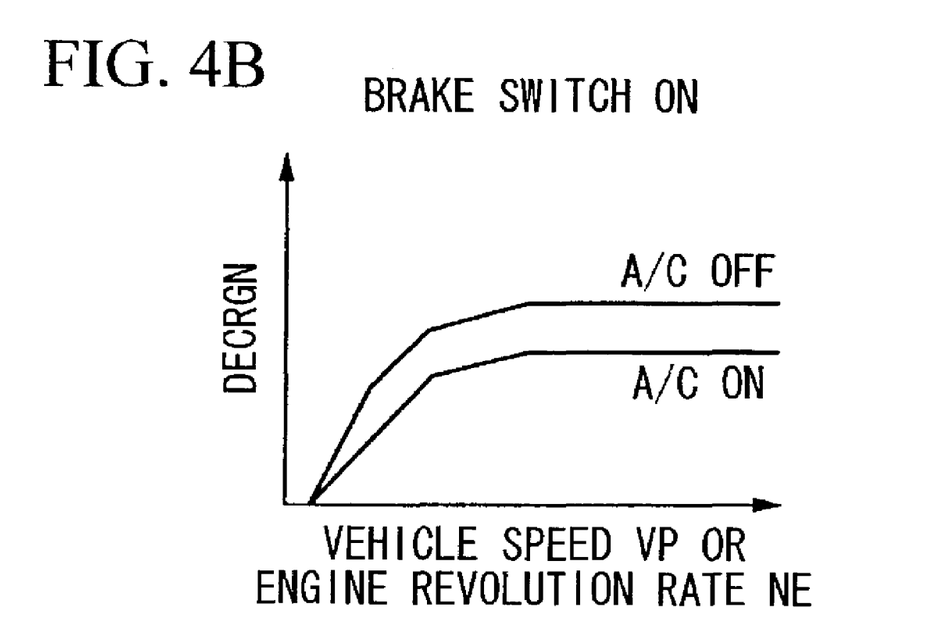
FIG. 4B is a graph showing a regeneration map during braking deceleration.
Figure 5:
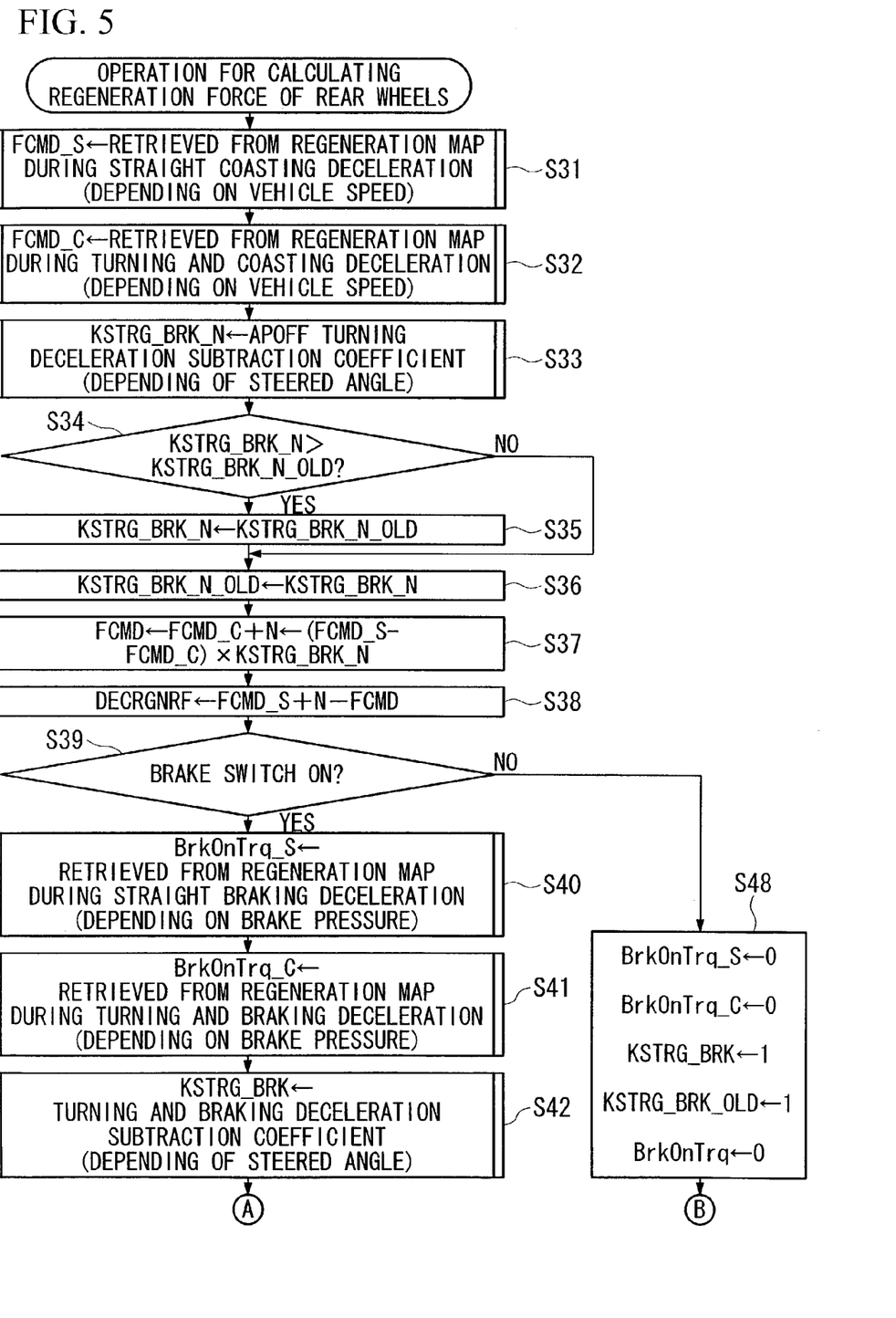
FIG. 5 is a flowchart showing the operation for setting an amount of regeneration to be regenerated by a rear motor MR when the vehicle decelerates.
Figure 6:
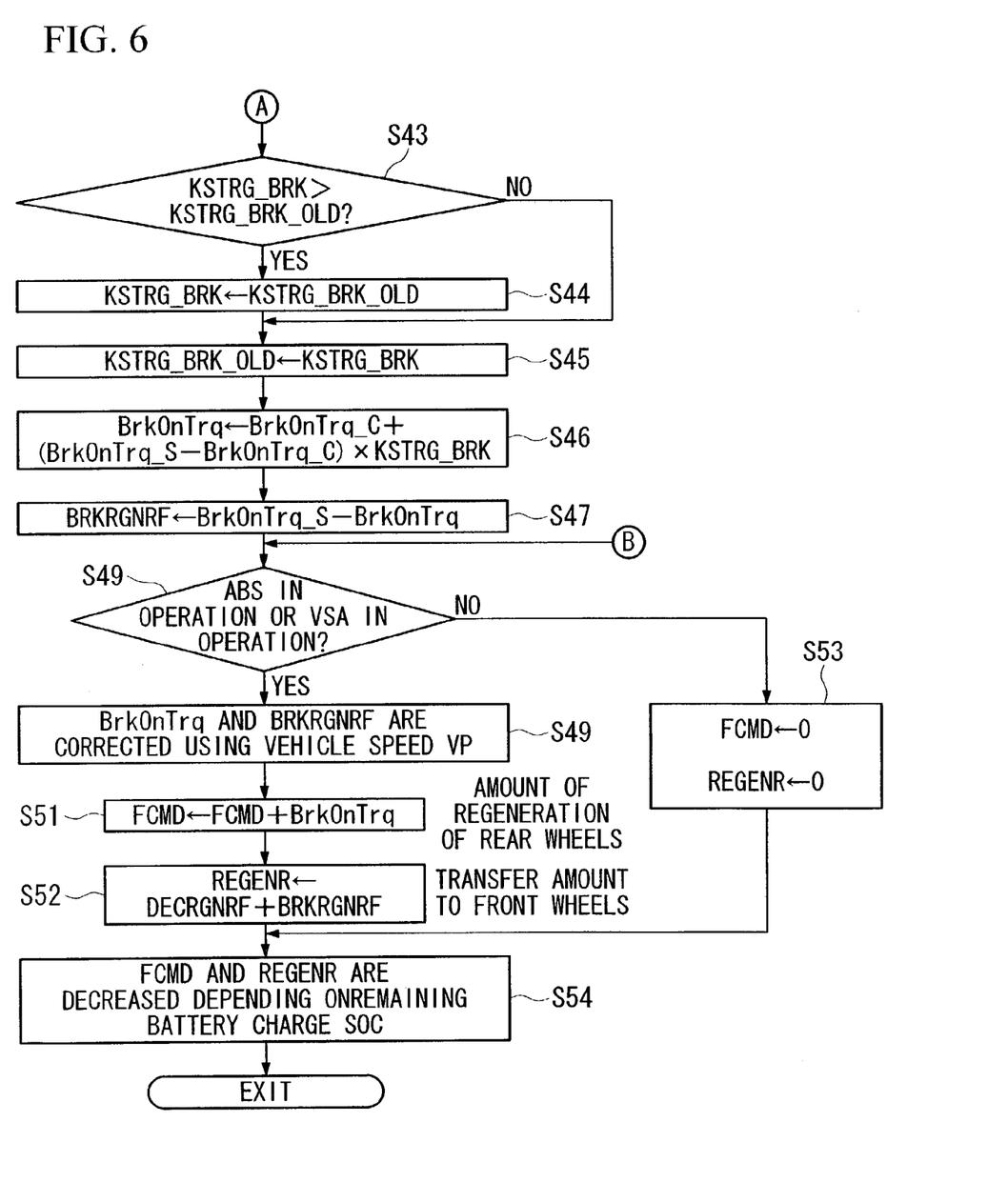
FIG. 6 is also a flowchart showing the operation for setting an amount of regeneration to be regenerated by a rear motor MR when the vehicle decelerates.
Figure 7A:
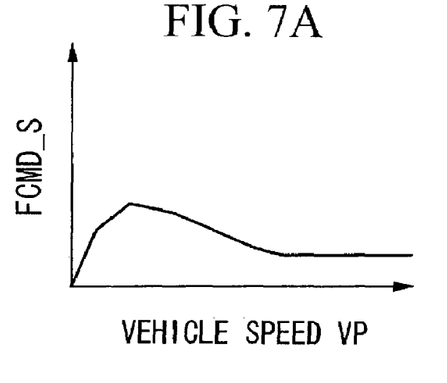
FIG. 7A is a graph showing a regeneration map during straight coasting deceleration.
Figure 7B:
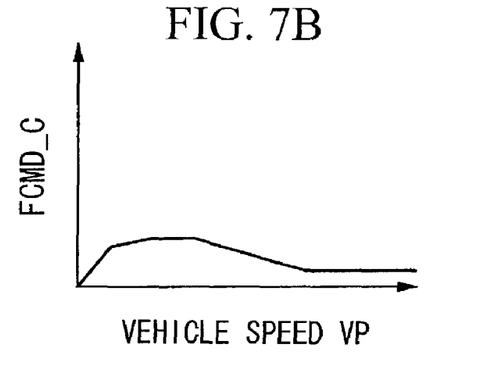
FIG. 7B is a graph showing a regeneration map during turning and coasting deceleration.
Figure 7C:
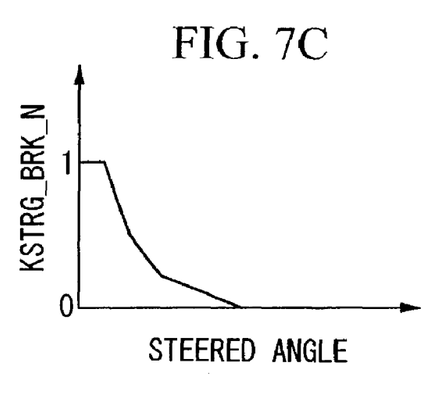
FIG. 7C is a graph showing a map for an APOFF turning deceleration subtraction coefficient.
Figure 7D:
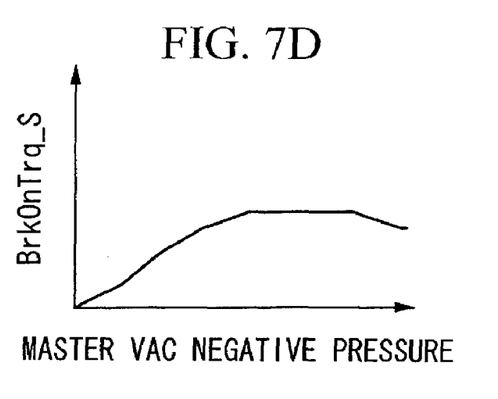
FIG. 7D is a graph showing a regeneration map during straight braking deceleration.
Figure 7E:
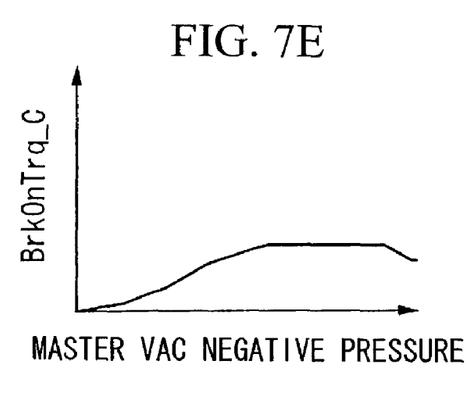
FIG. 7E is a graph showing a regeneration map during turning and braking deceleration.
Figure 7F:
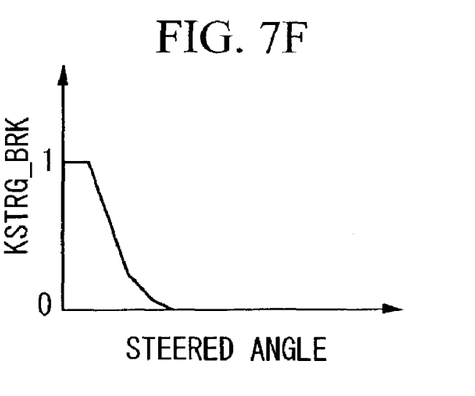
FIG. 7F is a graph showing a map for a turning and braking deceleration subtraction coefficient.

FIG. 3 is a flowchart showing the operation for setting an amount of regeneration to be regenerated by the front motor MF when the vehicle decelerates, FIG. 4A is a graph showing a regeneration map during coasting deceleration, and FIG. 4B is a graph showing a regeneration map during braking deceleration, FIGS. 5 and 6 are flowcharts showing the operation for setting an amount of regeneration to be regenerated by the rear motor MR when the vehicle decelerates, FIG. 7A is a graph showing a regeneration map during straight coasting deceleration, FIG. 7B is a graph showing a regeneration map during turning and coasting deceleration, FIG. 7C is a graph showing a map for an APOFF turning deceleration subtraction coefficient, FIG. 7D is a graph showing a regeneration map during straight braking deceleration, FIG. 7E is a graph showing a regeneration map during turning and braking deceleration, and FIG. 7F is a graph showing a map for a turning and braking deceleration subtraction coefficient.

Although the hybrid vehicle in this embodiment employs a CVT, the flowcharts which will be explained below also contain control operations for a vehicle employing an automatic transmission (AT) or a manual transmission (MT) to specify other possibilities.

The operation for determining the amount of regeneration (a regeneration command for front wheels REGENF), which is to be regenerated by the front motor MF, will be explained below.

First, in step S01 shown in FIG. 3, in a coasting deceleration state in which, for example, the opening degree of the accelerator pedal is zero, and the vehicle decelerates due to, for example, frictional loss in the internal combustion engine E, or in a brake operation state in which the brake switch 32 is in the ON state, and the vehicle decelerates due to a brake operation, the travel state of the vehicle is set as a deceleration mode.

Next, in step S02, it is determined whether the brake switch (brake SW) 32 is in the ON state.

When the result of the determination is "YES", the operation proceeds to step S03, in which a deceleration regeneration command DECRGN is set, for example, by retrieving the regeneration map during braking deceleration shown in FIG. 4B, and then the operation proceeds to step S08 which will be explained below.

In contrast, when the result of the determination is "NO", the operation proceeds to step S04, in which the deceleration regeneration command DECRGN is set, for example, by retrieving the regeneration map during coasting deceleration shown in FIG. 4A, and then the operation proceeds to step S05.

Note that, in steps S03 and S04, the deceleration regeneration command DECRGN is set depending on the vehicle speed VP for a vehicle employing an AT or a CVT, and the deceleration regeneration command DECRGN is set depending on the engine revolution rate NE for vehicle employing an MT.

In the regeneration map during coasting deceleration and the regeneration map during braking deceleration, the deceleration regeneration command DECRGN varies so as to increase as the vehicle speed VP or engine revolution rate NE increases. A greater deceleration regeneration command DECRGN is given in the regeneration map during braking deceleration than in the regeneration map during coasting deceleration when compared at the same vehicle speed VP or the same engine revolution rate NE.

Note that, in the regeneration map during coasting deceleration and the regeneration map during braking deceleration, the deceleration regeneration commands DECRGN are differently set depending on whether an air conditioner is in the ON or OFF state (A/C ON/OFF), more specifically, a greater deceleration regeneration command DECRGN is given when the air conditioner is in the OFF state than when in the ON state.

In step S05, it is determined whether the remaining battery charge SOC is equal to or greater than a predetermined remaining battery charge #SOC.

When the result of the determination is "NO", the operation proceeds to step S08.

In contrast, when the result of the determination is "YES", the operation proceeds to step S06, in which it is determined whether the vehicle speed VP is equal to or greater than a predetermined vehicle speed #VP.

When the result of the determination in step S06 is "NO", the operation proceeds to step S08 which will be explained below.

In contrast, when the result of the determination in step S06 is "YES", the operation proceeds to step S07, in which a value obtained by multiplying the deceleration regeneration command DECRGN by a predetermined coefficient k, which, for example, decreases as the vehicle speed VP increases and which is smaller than 1, is set as a renewed deceleration regeneration command DECRGN.

In step S08, it is determined whether or not the anti-lock brake system (ABS) is in operation, or whether or not the vehicle stability control (VSA) is being executed.

When the result of the determination is "YES", the operation proceeds to step S09, in which "0" is set to a deceleration regeneration command for front wheels DECRGNF, and the operation proceeds to step S10, in which "0" is set to the flag value of a deceleration regeneration flag F_DECRGN indicating that regeneration operation during deceleration is executed, and then the operation proceeds to step S22 which will be explained below.

In contrast, when the result of the determination is "NO", the operation proceeds to step S11, in which it is determined whether the remaining battery charge SOC is in a high remaining battery charge zone.

When the result of the determination in step S11 is "YES", the operation proceeds to step S09 explained above.

In contrast, when the result of the determination in step S11 is "NO", the operation proceeds to step S12.

In step S12, it is determined whether the timer value of a subtraction timer A is "0".

When the result of the determination is "NO", the operation proceeds to step S13, in which the timer value of the subtraction timer A is decreased, and then the operation proceeds to step S21 which will be explained below.

In contrast, when the result of the determination is "YES", the operation proceeds to step S14, in which a predetermined timer value #TA is set to the timer value of the subtraction timer A, and operation proceeds to step S15, in which it is determined whether the deceleration regeneration command DECRGN is greater than the deceleration regeneration command for front wheels DECRGNF which was set in the previous routine.

When the result of the determination in step S15 is "YES", the operation proceeds to step S19 which will be explained below.

In contrast, when the result of the determination in step S15 is "NO", the operation proceeds to step S16, in which a value obtained by subtracting a predetermined gradual subtraction term ΔRGNM from the deceleration regeneration command for front wheels DECRGNF is set as a renewed deceleration regeneration command for front wheels DECRGNF.

Note that the gradual subtraction term ΔRGNM is differently given depending on whether the brake switch 32 is in the ON or OFF state (e.g., a ΔRGNMB is given for the ON state, and a ΔRGNMN is given for the OFF state).

In step S17, it is determined whether the deceleration regeneration command for front wheels DECRGNF is equal to or greater than the regeneration command DECRGN.

When the result of the determination is "YES", the operation proceeds to step S21 which will be explained below.

In contrast, when the result of the determination is "NO", the operation proceeds to step S18, in which the regeneration command DECRGN is set to the deceleration regeneration command for front wheels DECRGNF, and the operation proceeds to step S21 which will be explained below.

In step S19, a value obtained by adding a predetermined gradual addition term ΔRGNP to the deceleration regeneration command for front wheels DECRGNF is set as a renewed deceleration regeneration command for front wheels DECRGNF.

Note that the gradual addition term ΔRGNP is given differently depending on whether the brake switch 32 is in the ON or OFF state (e.g., a ΔRGNPB is given for the ON state, and a ΔRGNPN is given for the OFF state).

In step S20, it is determined whether the deceleration regeneration command for front wheels DECRGNF is equal to or smaller than the regeneration command DECRGN.

When the result of the determination is "NO", the operation proceeds to step S18 explained above.

In contrast, when the result of the determination is "YES", the operation proceeds to step S21, "1" is set to the flag value of the deceleration regeneration flag F_DECRGN indicating that regeneration operation during deceleration is executed, and the operation proceeds to step S22.

In step S22, a value obtained by adding a deceleration regeneration transfer command for front wheels REGENR, which will be explained below, to the deceleration regeneration command for front wheels DECRGNF is set to the regeneration command for front wheels REGENF indicating an amount of regeneration to be regenerated by the front motor MF, and the series of operations is terminated.

Next, the operation, in which an amount of regeneration to be regenerated by the rear motor MR (a deceleration regeneration command for rear wheels FCMD) and a transfer amount of regeneration (a deceleration regeneration transfer command for front wheels REGENR) which is subtracted from the amount of regeneration to be regenerated by the rear motor MR and which is added to the amount of regeneration to be regenerated by the front motor MF are set, will be explained below.

First, in step S31 shown in FIG. 5, a straight coasting deceleration regeneration command FCMD_S, which is used when, for example, the opening degree of the accelerator pedal is zero and the vehicle decelerates due to, for example, frictional loss in the internal combustion engine E while coasting straight ahead, is retrieved from, for example, the regeneration map during straight coasting deceleration shown in FIG. 7A depending on the vehicle speed VP.

Next, in step S32, a turning and coasting deceleration regeneration command FCMD_C, which is used when, for example, the opening degree of the accelerator pedal is zero and the vehicle decelerates due to, for example, frictional loss in the internal combustion engine E while coasting and turning, is retrieved from, for example, the regeneration map during turning and coasting deceleration shown in FIG. 7B depending on the vehicle speed VP.

Note that the straight coasting deceleration regeneration command FCMD_S is set to be greater than the turning and coasting deceleration regeneration command FCMD_C when compared at the same vehicle speed VP.

In step S33, an APOFF turning deceleration subtraction coefficient KSTRG_BRK_N, which decreases the amount of regeneration to be regenerated by the rear motor MR when the vehicle decelerates while turning and coasting, is retrieved from, for example, the map for the APOFF turning deceleration subtraction coefficient shown in FIG. 7C depending on the steered angle of the front wheels Wf.

Note that predetermined APOFF turning deceleration subtraction coefficients KSTRG_BRK_N, which decrease as the steered angle of the front wheels Wf increases, and which are smaller than 1, are set in the map for the APOFF turning deceleration subtraction coefficient.

In step S34, it is determined whether the APOFF turning deceleration subtraction coefficient KSTRG_BRK_N in the current routine is greater than a previous value KSTRG_BRK_N_OLD which was calculated in the previous routine.

When the result of the determination is "NO", the operation proceeds to step S36 which will be explained below.

In contrast, when the result of the determination is "YES", the operation proceeds to step S35, in which the previous value KSTRG_BRK_N_OLD is set to the APOFF turning deceleration subtraction coefficient KSTRG_BRK_N, whereby the APOFF turning deceleration subtraction coefficient KSTRG_BRK_N in the current routine is prevented from exceeding the previous value KSTRG_BRK_N_OLD.

Next, in step S37, a value, which is obtained by adding the turning and coasting deceleration regeneration command FCMD_C to a value obtained by multiplying the difference between the turning and coasting deceleration regeneration command FCMD_C and the straight coasting deceleration regeneration command FCMD_S and the APOFF turning deceleration subtraction coefficient KSTRG_BRK_N together, is set to the deceleration regeneration command for rear wheels FCMD. In other words, in order to set the deceleration regeneration command, an interpolation is performed between the turning and coasting deceleration regeneration command FCMD_C and the straight coasting deceleration regeneration command FCMD_S using the steered angle of the front wheels.

Next, in step S38, a value obtained by subtracting the deceleration regeneration command for rear wheels FCMD from the straight coasting deceleration regeneration command FCMD_S is set to an APOFF deceleration regeneration transfer command for front wheels DECRGNRF, which is subtracted from the amount of regeneration to be regenerated by the rear motor MR and added to the amount of regeneration to be regenerated by the front motor MF, among the deceleration regeneration commands in a coasting deceleration state.

In step S39, it is determined whether the brake switch 32 is in the ON state.

When the result of the determination is "NO", the operation proceeds to step S48 which will be explained below.

In contrast, when the result of the determination is "YES", the operation proceeds to step S40, in which a deceleration regeneration command during straight braking BrkOnTrq_S, which is used when the vehicle travels straight ahead and decelerates by braking, is retrieved from, for example, the regeneration map during straight braking deceleration shown in FIG. 7D depending on a master vac negative pressure (brake pressure).

In step S41, a deceleration regeneration command during straight braking BrkOnTrq_C, which is used when the vehicle turns and decelerates by braking, is retrieved from, for example, the regeneration map during turning and braking deceleration shown in FIG. 7E depending on a master vac negative pressure.

Note that, for example, the deceleration regeneration command during straight braking BrkOnTrq_S is set to be greater than the deceleration regeneration command during straight braking BrkOnTrq_C when compared at the same master vac negative pressure.

In step S42, a deceleration regeneration command during straight braking BrkOnTrq_C, which is used to decrease the amount of regeneration to be regenerated by the rear motor MR when the vehicle turns and decelerates by braking, is retrieved from, for example, the map for a turning and braking deceleration subtraction coefficient shown in FIG. 7F depending on the steered angle of the front wheels Wf.

Note that predetermined turning and braking deceleration subtraction coefficients which, for example, decrease as the steered angle of the front wheels Wf increases and which are smaller than 1, are set in the map for a turning and braking deceleration subtraction coefficient.

In step S43 shown in FIG. 6, it is determined whether a turning and braking deceleration subtraction coefficient KSTRG_BRK in the current routine is greater than a previous turning and braking deceleration subtraction coefficient KSTRG_BRK_OLD which was calculated in the previous routine.

When the result of the determination is "NO", the operation proceeds to step S45 which will be explained below.

In contrast, when the result of the determination is "YES", the operation proceeds to step S44, in which the previous turning and braking deceleration subtraction coefficient KSTRG_BRK_OLD is set to the turning and braking deceleration subtraction coefficient KSTRG_BRK, whereby the turning and braking deceleration subtraction coefficient KSTRG_BRK in the current routine is prevented from exceeding the previous turning and braking deceleration subtraction coefficient KSTRG_BRK_OLD in the previous routine.

Next, in step S45, the turning and braking deceleration subtraction coefficient KSTRG_BRK in the current routine is set as the previous turning and braking deceleration subtraction coefficient KSTRG_BRK_OLD for preparing the next routine.

In step S46, a value, which is obtained by adding the deceleration regeneration command during straight braking BrkOnTrq_C to a value obtained by multiplying the difference between the deceleration regeneration command during straight braking BrkOnTrq_C and the deceleration regeneration command during straight braking BrkOnTrq_S and the turning and braking deceleration subtraction coefficient KSTRG_BRK together, is set to a braking deceleration regeneration command BrkOnTrq. In other words, in order to set the deceleration regeneration command, an interpolation is performed between the deceleration regeneration command during straight braking BrkOnTrq_C and the deceleration regeneration command during straight braking BrkOnTrq_S using the steered angle of the front wheels.

Next, in step S47, a value obtained by subtracting the braking deceleration regeneration command BrkOnTrq from the deceleration regeneration command during straight braking BrkOnTrq_S is set to a braking deceleration regeneration transfer command for front wheels BRKRGNRF, which is subtracted from the amount of regeneration to be regenerated by the rear motor MR and added to the amount of regeneration to be regenerated by the front motor MF, among the deceleration regeneration commands in a braking deceleration state, and the operation proceeds to step S49 which will be explained below.

In step S48, "0" is set to the deceleration regeneration command during straight braking BrkOnTrq_S, the deceleration regeneration command during straight braking BrkOnTrq_C, and the braking deceleration regeneration command BrkOnTrq, while "1" is set to the turning and braking deceleration subtraction coefficient KSTRG_BRK in the current routine and the previous turning and braking deceleration subtraction coefficient KSTRG_BRK_OLD in the pervious routine, and then the operation proceeds to step S49.

In step S49, it is determined whether the anti-lock brake system (ABS) is in operation, or whether the control operation for stabilizing the vehicle behavior is being executed.

When the result of the determination is "YES", the operation proceeds to step S53 which will be explained below.

In contrast, when the result of the determination is "NO", the operation proceeds to step S50, in which the braking deceleration regeneration command BrkOnTrq and the braking deceleration regeneration transfer command for front wheels BRKRGNRF are corrected using the vehicle speed VP.

Note that, in step S50, the braking deceleration regeneration command BrkOnTrq and the braking deceleration regeneration transfer command for front wheels BRKRGNRF are set so as to decrease, for example, as the vehicle speed VP decreases within a predetermined range.

In step S51, a value obtained by adding the braking deceleration regeneration command BrkOnTrq to the deceleration regeneration command for rear wheels FCMD is set as a renewed deceleration regeneration command for rear wheels FCMD.

In step S52, a value obtained by adding the braking deceleration regeneration transfer command for front wheels BRKRGNRF to the APOFF deceleration regeneration transfer command for front wheels DECRGNRF is set as the deceleration regeneration transfer command for front wheels REGENR, and the operation proceeds to step S54.

In step S53, "0" is set to the deceleration regeneration command for rear wheels FCMD and to the deceleration regeneration transfer command for front wheels REGENR, and the operation proceeds to step S54.

In step S54, the deceleration regeneration command for rear wheels FCMD and the deceleration regeneration transfer command for front wheels REGENR are corrected depending on the remaining battery charge SOC, and the series of operations is terminated.

In this step S54, when, for example, the remaining battery charge SOC is in a high remaining battery charge zone, the deceleration regeneration command for rear wheels FCMD and the deceleration regeneration transfer command for front wheels REGENR are decreased in accordance with the remaining battery charge SOC.

According to the control device for a hybrid vehicle of the present embodiment, when the vehicle turns and decelerates, by adding the deceleration regeneration transfer command for front wheels REGENR, which is subtracted from the deceleration regeneration command for rear wheels FCMD, to the deceleration regeneration command for front wheels DECRGNF, the deceleration regeneration force of the rear wheels is decreased, whereby the stability of the vehicle is improved, and decrease in the total amount of regenerated energy in the entire vehicle can be prevented; therefore, an effective deceleration regeneration can be performed.

Note that, in the above embodiment, the deceleration regeneration command DECRGN calculated in steps S03 and S04 may be corrected by the electrical current which is output from the 12-volt battery 15, i.e., depending on the load in the 12-volt electrical system. In this case, the deceleration regeneration command DECRGN should be increased as the load in the 12-volt electrical system increases.

As explained above, according to the control device for a hybrid vehicle of the present invention, when the vehicle turns and decelerates, the stability of the vehicle can be improved by decreasing the deceleration regeneration force of the rear wheel. Furthermore, because the amount of regeneration subtracted from the amount of regeneration in rear wheels is added to the amount of regeneration in front wheels, decrease in the total amount of regenerated energy in the entire vehicle can be prevented; therefore, an effective deceleration regeneration can be performed.

According to the control device for a hybrid vehicle of a further aspect of the present invention, because the transfer amount of regeneration from the rear wheels to the front wheels when the vehicle decelerates is properly set depending on the degrees of turning and deceleration of the vehicle, the stability of the vehicle and the efficiency of regeneration can be further improved.

What is claimed is:

1. A control device for a hybrid vehicle comprising:
   front wheels which are steerable, and which are connectable to at least one of an internal combustion engine and a first motor via a transmitting section;
   rear wheels which are connected to a second motor;
   a regenerative operation control section which enables regeneration of energy through the regenerative operation of said first motor and second motor when the vehicle decelerates; and
   a regeneration amount control section which operates so as to decrease the amount of regeneration to be regenerated by said second motor while increasing the amount of regeneration to be regenerated by said first motor so as to prevent decrease in the total amount of regenerated energy in the entire vehicle depending on the steered angle of said front wheels when said hybrid vehicle in a deceleration and turning state.

2. A control device as claimed in claim 1, further comprising:
   a deceleration state measuring section which measures the deceleration state of said vehicle; and
   a regeneration amount changing section which changes the amounts of regeneration energy to be regenerated by said first and second motor, each of which is set by said regeneration amount control section, depending on the deceleration state measured by said deceleration state measuring section.

* * * * *